April 17, 1956 A. R. MEYER 2,742,553
SUBMERGED ARC WELDING METHOD AND APPARATUS
Filed Feb. 15, 1954 5 Sheets-Sheet 4
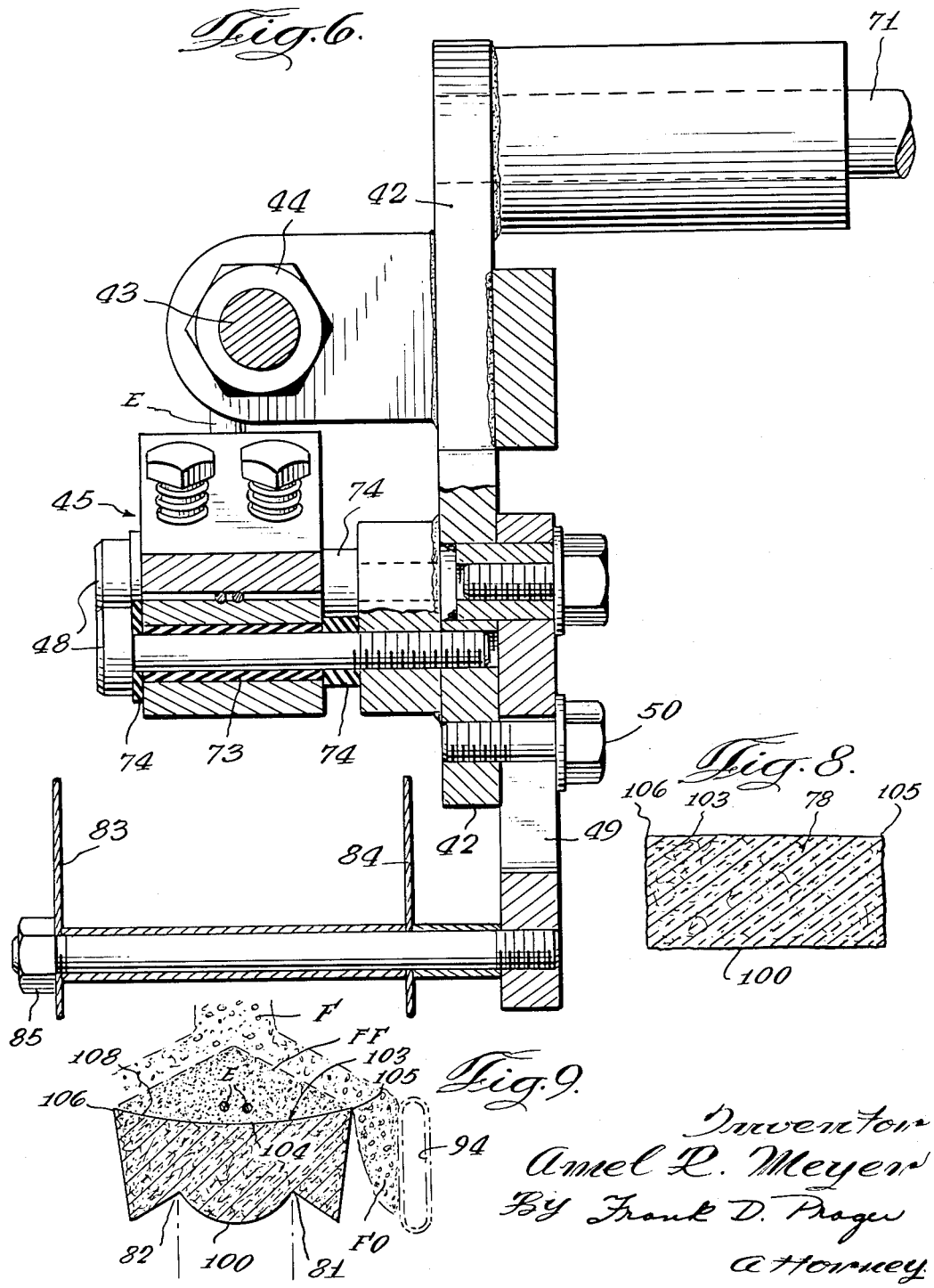

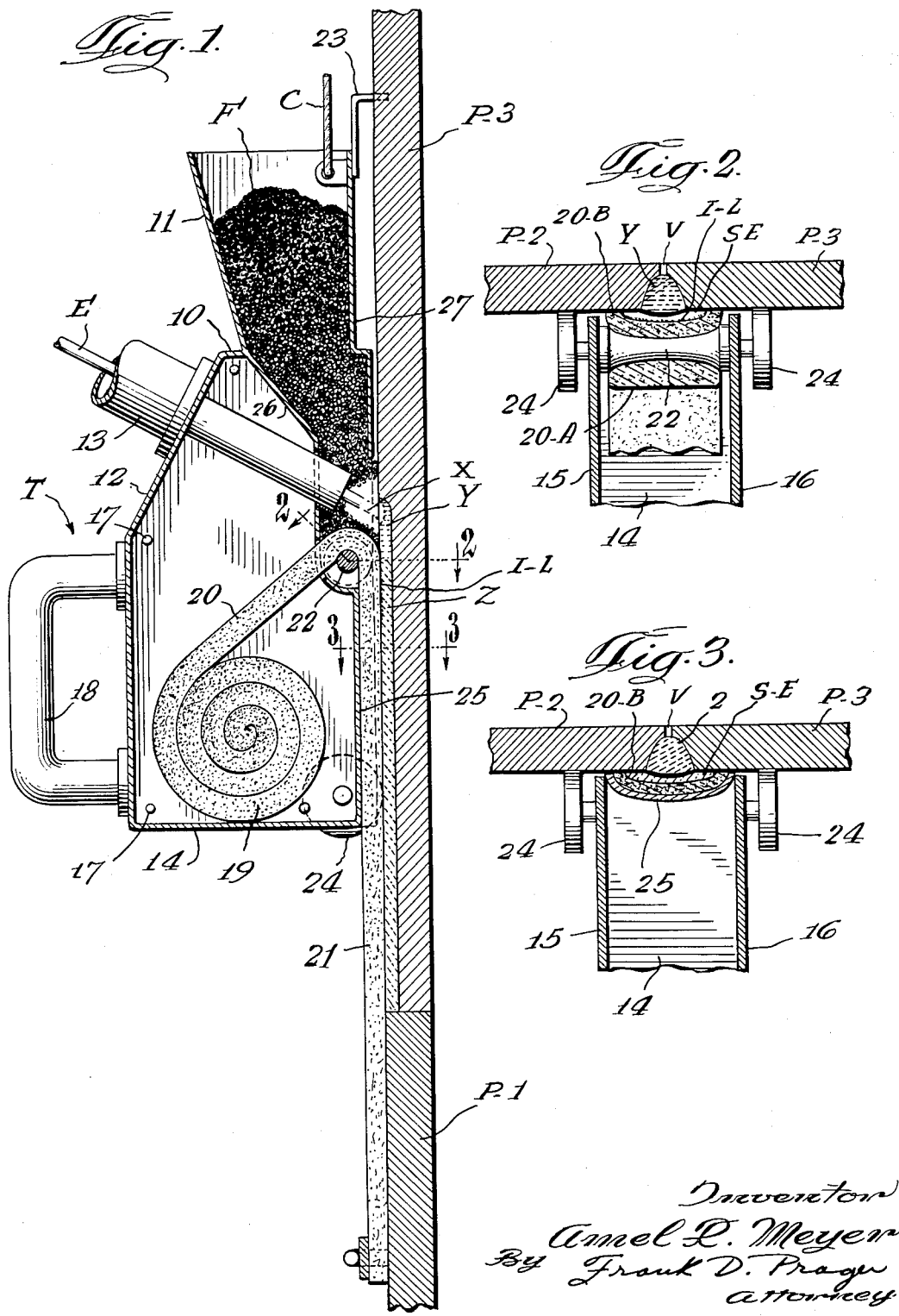

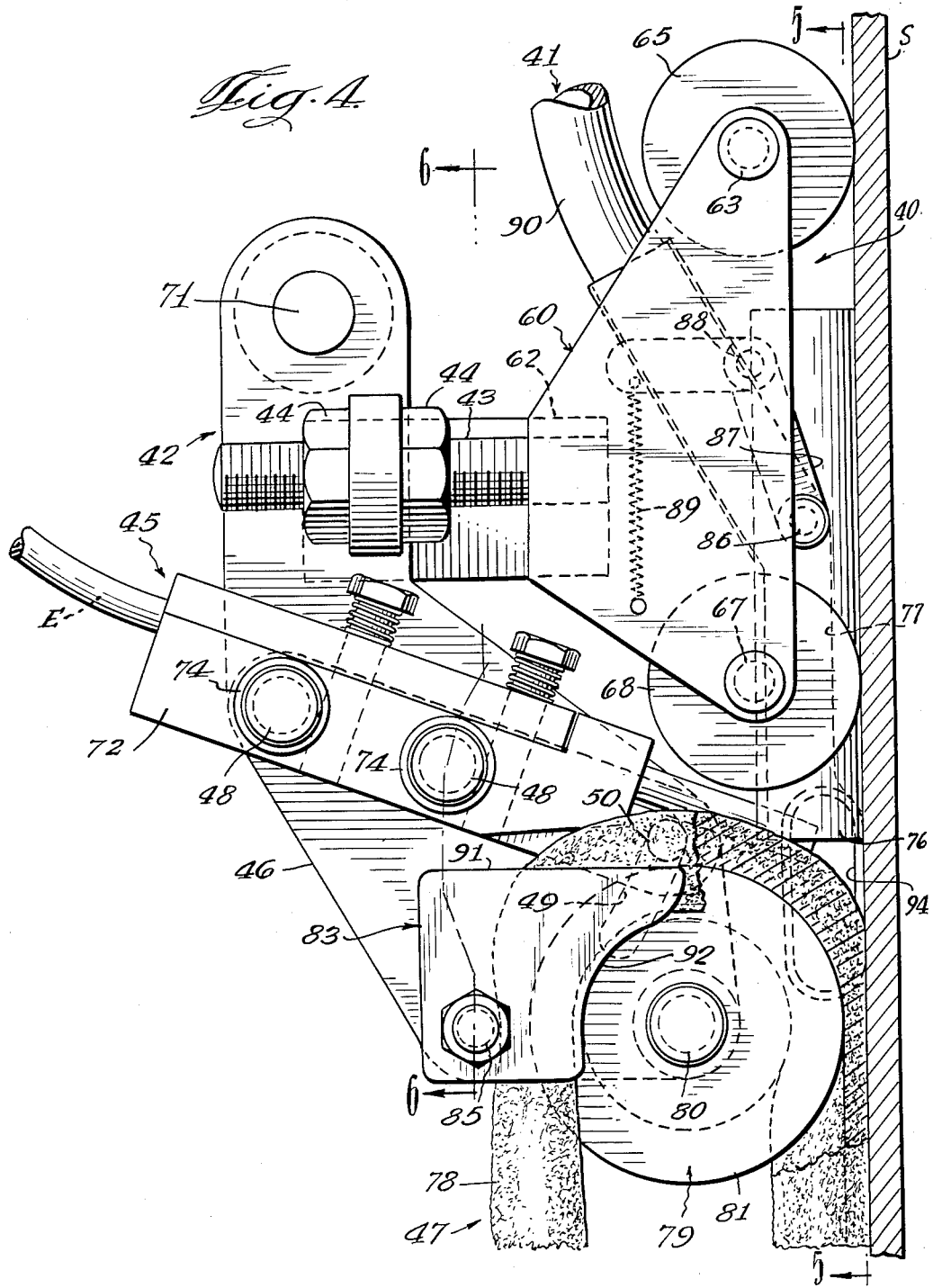

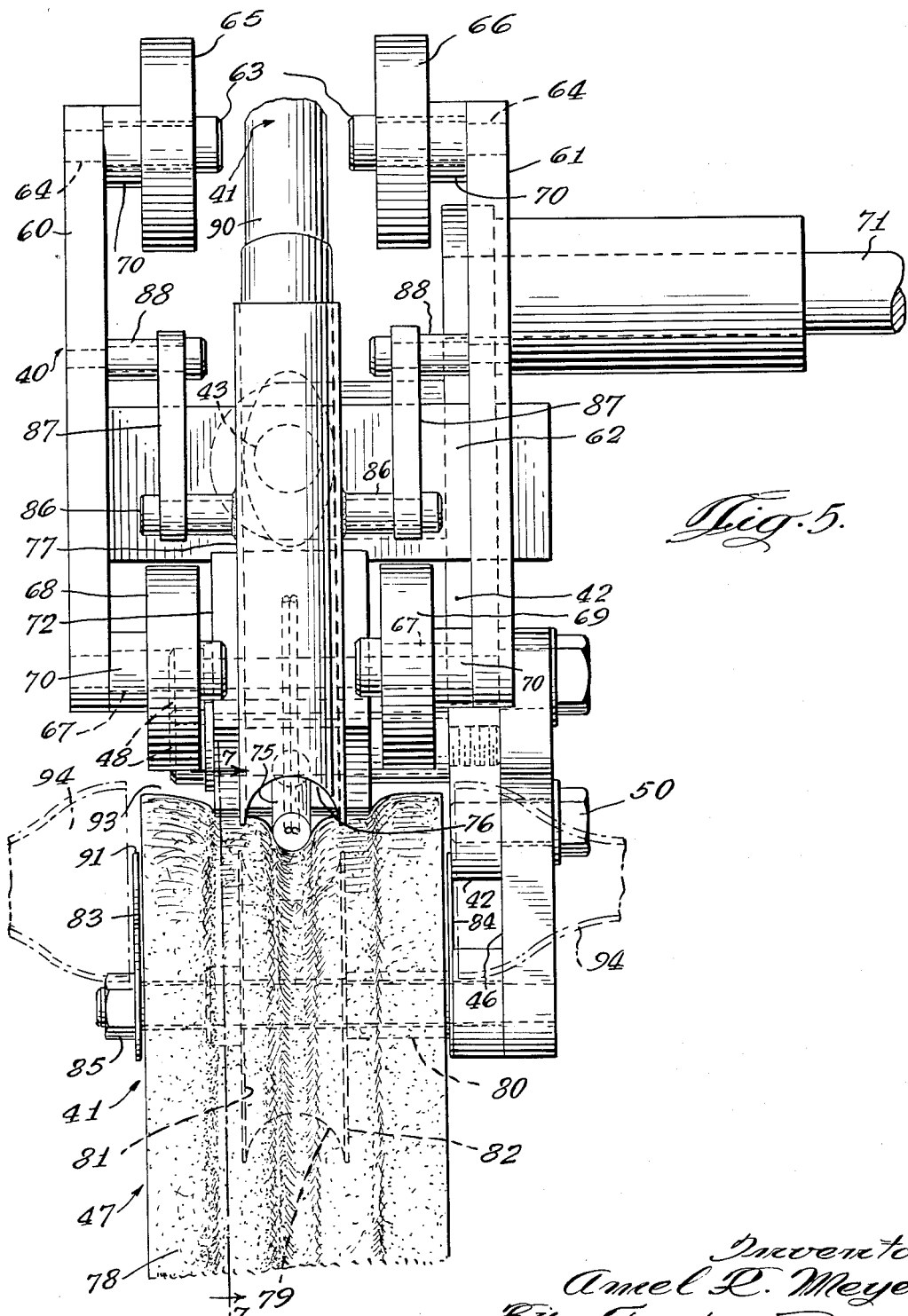

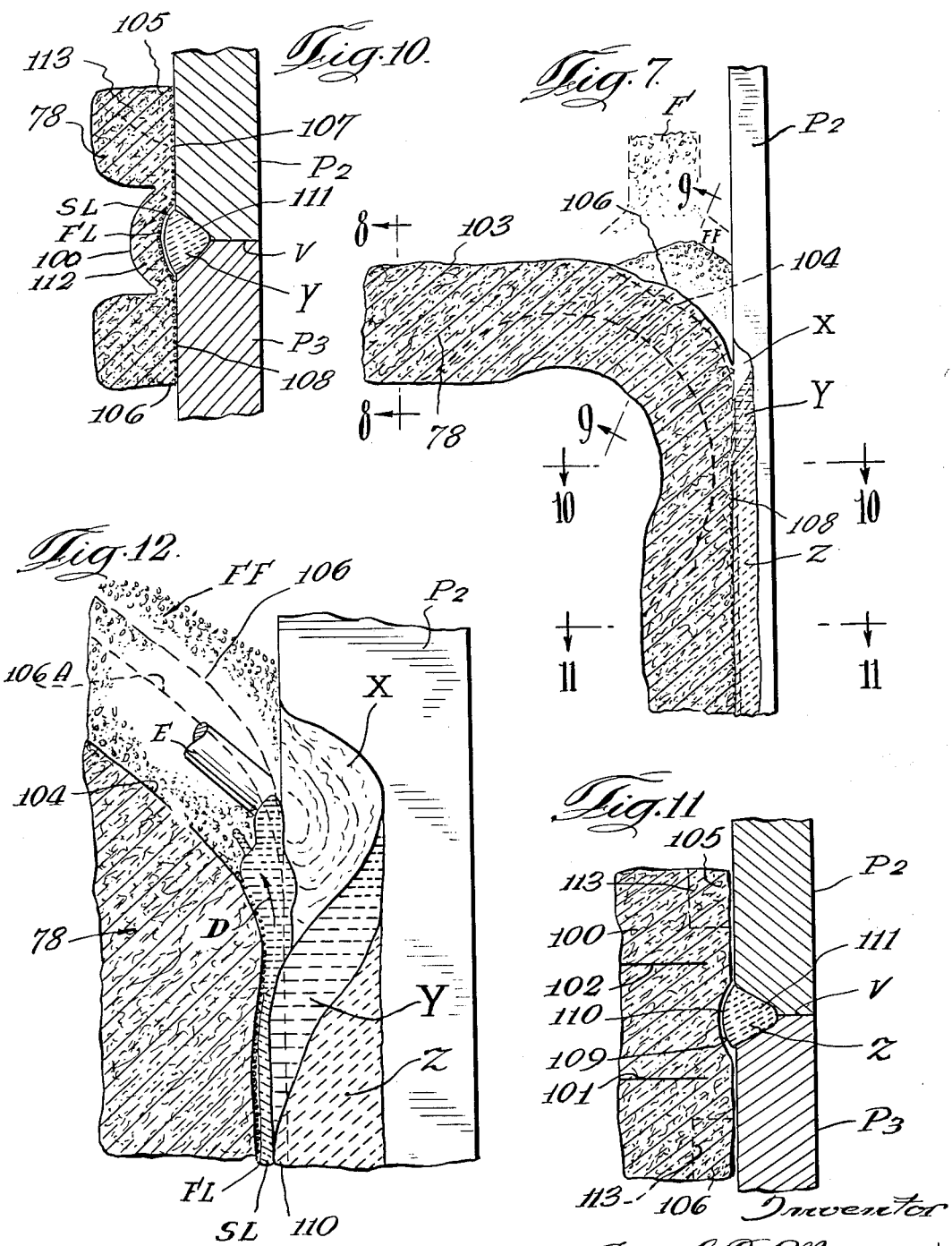

United States Patent Office 2,742,553
Patented Apr. 17, 1956

2,742,553

SUBMERGED ARC WELDING METHOD AND APPARATUS

Amel R. Meyer, Griffith, Ind., assignor to Graver Tank & Mfg. Co., Inc., East Chicago, Ind., a corporation of Delaware Application February 15, 1954, Serial No. 410,380

9 Claims. (Cl. 219—8)

This invention relates to submerged arc welding of elongated seams on work piece surfaces facing laterally, mainly when such seams extend in substantially upward directions. The seam will then be designated hereinafter as a vertical seam. The invention is an improvement over those described in the co-pending applications of Meyer, Serial No. 354,119 now Patent No. 2,673,916 and Meyer et al., Serial No. 358,314 now Patent No. 2,677,036. The present application is a continuation-in-part of said first mentioned Meyer application.

As disclosed in said first mentioned Meyer application it has been discovered that the difficult task of submerged arc welding vertical seams can be performed successfully, with rapid deposition of sound welded seams, by molding and supporting the resulting melt with a resiliently compressible, heat-resistant, heat-insulating body or strip, pressed against the melt so as to partly compress that body or strip. The submerged arc inherently forms an envelope of slag and flux around the metal melt and this is supplemented in the new process by superimposing on this envelope, in the welding zone below the arc, an outer envelope of said material, which may consist for instance of light glass wool sheeting.

It has further been disclosed in the application of Meyer et al. that a zone of reduced pressure should be formed preferably at the side edges of the flux zone and in the upper part of the welding zone including the bottom part of the arc crater, and that a certain controlled displacement of flux and slag should take place through this reduced pressure zone while the metallic melt of course should be left in place.

According to both of said earlier applications the pressure strip or glass wool belt adjacent the welding zone, was confined between the shell and rigid wall or flange members oriented in upright positions transversely of the shell and contacting the shell with their edges. According to the Meyer et al. application the flux zone was laterally confined by such rigid wall or flange members, openings being formed in such members to allow lateral escape or venting of flux and slag.

It has now been discovered that materially better results are obtained by seemingly minor modifications of the flux zone, pressure strip and pertinent details and procedures. Such modifications involve mainly the removal of the aforementioned rigid wall or flange members, and partial replacement thereof by flexible, differently oriented, preferably disposable flange portions of the pressure strip. Geometrically, such modifications tend to produce a flexible and somewhat indefinite boundary of the flux zone. Physically, they were found to provide more uniform pressure distribution in the welding zone below the arc; and because of the forward movement and replacement of the pressure strip at the vent opening, the new design eliminates the problem of vent clogging, thereby further insuring practical uniformity of distribution and pressure in the different parts of the welding zone. The details will best be described with reference to the drawing, wherein typical embodiments of the present invention and of the earlier Meyer invention are diagrammatically shown.

In the drawing:

Figure 1 is a side view of apparatus in accordance with said first mentioned Meyer application, with one of said rigid walls removed to disclose interior parts; this figure being identical with Figure 3 of said first mentioned Meyer application.

Figures 2 and 3 are fragmentary sections taken respectively along lines 2—2 and 3—3 in Figure 1; these figures being identical respectively with Figures 5 and 7 of said first mentioned Meyer application.

Figure 4 is a side view of a preferred form of apparatus in accordance herewith.

Figures 5 and 6 are views taken along lines shown in Figure 4 and correspondingly numbered.

Figure 7 is a sectional view taken along lines 7—7 in Figure 5 but omitting the rigid parts of the apparatus in order to show more clearly the work-piece, welding zone, flux zone and pressure strip.

Figures 8, 9, 10 and 11 are sections taken along lines shown in Figure 7 and correspondingly numbered, and Figure 12 is an enlarged detail from Figure 7.

*Figures 1 to 3*

A shell S is composed of upright plates P2 and P3 which are to be joined by an elongated vertical seam V. For this purpose there is provided a welding tool T having a top wall 10 provided with a flux receiver hopper 11; a back wall 12 provided with an electrode receiver nozzle 13; and a substantially closed bottom wall 14. The tool T also has a pair of side walls 15 and 16 which are rigid so that the tool in effect has a boxlike form; these side walls being held together with the other walls by suitable bolts 17. One side of the boxlike device, facing the shell plates P2, P3 and identified as the front side is at least partly open.

The tool unit T is suspended and counterweighted from a suitable hoist (not shown) by a pair of chains or cables C. It is provided with a handle 18, secured to the back wall 12, in order to allow manual raising of the tool along the seam V, at a predetermined rate. At the end of an upward traverse and before the start of the next upward traverse the tool can be lowered by the same handle.

A roll 19 is formed of a long and narrow strip 20 of light glass wool sheeting and is disposed within the tool or container T, resting upon the bottom wall 14. A very suitable material has been discovered in that made and sold by the Fiber Glass Division of Libbey, Owens, Ford Glass Co. under the trade name "Aircore." Pertinent properties of some of the Aircore materials can be listed as follows:

| Type Number | Weight, Lbs./Cu. Ft. | A Strip of 1 Inch Thickness is Resiliently Compressible to— |
|---|---|---|
| 315 | ¾ | ⅛ Inch or Less. |
| 316 | 1 | ³⁄₁₆ Inch or Less. |
| 318 | 1½ | ¼ Inch or less. |

The free end 21 of this strip 20 extends over a guiding device such as a roller 22 horizontally journaled between the side walls 15 and 16 adjacent the front of the tool. The arrangement is such that the strip 20 extends from the roll 19 upward to and over the roller 22 and then downward along the plates P2, P3.

The tool T has a pointer or feeler device 23 attached to the top, whereby it can be kept lined up with the vertical seam V; and the roller 22 is so arranged as to keep the strip 20 similarly aligned, symmetrically with the seam V.

The vertical, plate-contacting portion of the glass wool strip or belt 20 is pressed against the seam area of the plates P2, P3 by the grooved roller 22. In the present embodiment the flanges of the roller may contact the shell plates or, as shown in Figure 2, almost contact them. The lower end of the tool T is suitably spaced from the plates P2, P3 by outer rollers 24 thereon, which are kept in contact with the plates P2, P3 below the inner roller 22, for instance by suitable pressure applied through the handle 18.

The pressure applied to the glass wool strip 20 by the roller 22 is supplemented by additional pressure applied to a lower portion of the strip, below the roller 22, by a backing wall 25. This wall is rigidly secured to one or both of the side walls 15, 16. It extends from below and adjacent the roller 22 downward to the bottom 14 in a direction generally parallel with the plates P2, P3.

Above the roller 22 the wall 25 is continued upwardly by a similar wall 26, forming a back wall of the flux hopper 11. This wall 26 guides the flux to the front opening of the container 10, which opening is provided between the roller 22 and the superposed bottom end of the front wall 27 of the flux hopper.

In operation the pressure of the roller 22 and of the backing wall 25 appreciably compresses the strip or belt 20. The cross sectional area of this strip is mainly reduced by the compression of the strip between the roller 22 and the plates P2, P3, as shown in Figure 2 at 20B. To some slight extent said cross sectional area is reduced even before such compression, as shown at 20A.

Three different materials are directed to and forwardly through the open portion of the front of the tool T: electrode wire E, flux F and belt or strip material 20.

Substantially all of the electrode material E is converted by the arc X into one of the metallic components of the weld zone Y and weld seam Z. Portions of the flux F, slightly varying in amount, are fused into a slag envelope SE extending over and in contact with the exposed outer surface of the welding zone Y and seam Z. The belt 20 forms a superimposed envelope over this slag envelope SE. An intermediate layer IL of flux F, not fused by the arc, is interposed between the belt 20 and the fused slag SE.

While the melt Y and layers SE, IL are being formed in front of the belt 20, the electrode E and the arc puddle X formed thereby are continuously traversed upward; the flux F is continuously fed downward into the arc puddle X; and the belt material 20 is continuously fed over the roller 22 toward the puddle X and welding zone Y, thereby intercepting the layer IL of solid flux. Thus the front portions of the flux layer IL are in contact with the plates P2, P3 and with the weld zone Y and are substantially stationary relative thereto. The successive belt portions reaching the exposed outer surface of the slag envelope SE and welding zone Y, heat-insulated by the flux layer IL, serve to supplement the surface tension of said envelope, thereby supporting the same and the molten metal behind it, against the downward gravitational displacement that would otherwise occur. Such support is vital for the formation of a proper and sound weld bead.

Variable amounts of entrained flux IL and fused flux SE are likely to be present at successive superimposed locations. The resilient compressibility of the belt is important in this connection. It allows the deposition of a metallic melt of proper uniformity and contour, mainly when proper precautions are taken in the upper part of the welding zone as will be explained in connection with Figures 4 to 12.

The heat of the welding zone Y is capable of partially destroying the belt 20. Due to the interception of an insulating flux layer IL and the use of a proper pressure belt material as described, serious destructive effects can be prevented. The belt or strip, while being expendable, can be kept in proper form during the time and at the site of deposition of the weld bead.

On the other hand the heat of the welding zone Y is also affected by the application of the belt 20 and of the insulating layer IL in front thereof. A material chilling effect is produced by the intercepted cold flux layer IL.

In this connection I have observed facts indicating that the most effective method of heat input tends to be different in the present process from that which is conventionally used in normal flat downhand submerged arc welding, when other things are equal. It seems that best results are obtained by a combination of relatively thin electrodes, relatively slow speeds, and relatively slow to normal total heat input per foot of bead. By means of small size and low speed of electrodes, the amount of heat so applied is concentrated on a narrow plate area; thereby partly counteracting the inherent chilling of the welding zone which has been explained.

By the expedient of laying down two mutually opposing beads simultaneously or substantially simultaneously, the effective, overall operating speed can still be quite rapid as compared with the conventional shop routine with flat downhand welding.

*Figures 4 to 12*

This preferred form of welding shoe or tool as generally shown in Figures 4 and 5 forms a small carriage, adapted to run vertically along the shell S. This carriage comprises a four-wheeled body, front and top part 40, mainly for the support of flux supply means 41. It also comprises a rear superstructure 42 rigidly but adjustably connected with the body 40 by a stud 43 threaded into the body and engaging the superstructure by nuts 44. This superstructure 42 serves to support electrode supply means 45 and a frame 46 for melt support means 47. The melt support frame 46 is angularly adjustable in a vertical plane, normal to the shell S; for this purpose it is pivoted on and normally secured to the superstructure 41 by one of two parallel bolts 48 which also serve to secure the electrode supply means 45 to the structure 42. The range of angular adjustment of frame 46 about bolt 48 is defined by an arcuate slot 49 in the frame 46, adapted to receive a bolt 50 secured to the structure 42. In this manner the exact position of the electrode supply means 45 relative to the melt support means 47 and to the adjacent portions of the seam S can readily be adjusted. This becomes necessary mainly when the tool is used on plates of different thickness and/or edge preparation.

The carriage body 40 comprises a pair of vertically oriented plates 60, 61, rigidly held apart by a block or brace 62. This block as shown may be welded therebetween; it also serves to provide a socket for the stud 43. In upper front parts of the shoe frame plates 60, 61, a pair of axles 63 are fitted, by screw threads 64, said axles having respectively wheels 65, 66 thereon. In lower front parts of the same shoe frame plates 60, 61 similar axles 67 are fitted, having respectively wheels 68, 69 thereon. In the embodiment shown the wheels 65, 66, 68, 69 run on friction bearings 70.

A holder shaft or pin 71 passes through the superstructure 42, adjacent the top of the entire shoe, for attachment to a suitable hoist and control linkage (not shown). The several bolts, pins and axles 48, 63, 67 and 71 are horizontal and are parallel with one another and with the work piece surface S, so that the tool can be held against and manipulated along said surface with a pressure suitably equalized over the four wheels 65, 66, 68, 69.

Referring now to Figures 4 and 6, the electrode supply means 45 comprises an electrode nozzle 72, the rear end of which is held to and electrically insulated from the superstructure 42 by a pair of insulator sleeves 73, transversely and horizontally fitted into the nozzle, and by insulator washers 74, fitted to the sides of the nozzle; these members 73, 74 surrounding the pair of bolts 48.

Referring again to Figures 4 and 5: a nozzle tip 75 extends forwardly and somewhat downwardly from the front of the electrode nozzle 72, to feed the electrodes E to the direct vicinity of the shell S and arc zone X. Directly above this zone there is the discharge opening 76 of a flux nozzle 77 forming part of the flux supply means 41. Directly below the arc zone X and nozzle tip 75, the melt support belt 78 runs over a roller 79 free wheeling on a horizontal pin 80. The pin extends from the melt supply frame 46, parallel with the pins and axles 48, etc. Thus a mound of flux F is discharged onto the belt 78 adjacent to the arc zone X, submerging said zone.

The roller 79 is shown as having an outwardly concave, smoothly curved contour in all cross sections. At the sides of the roller body this contour merges with narrow, projecting flanges 81, 82. The horizontal distance between these flanges is suitably greater than the width of the weld bead to be formed, while being smaller than the width of the belt 78. The radius of the flanges 81, 82 and of the entire roller is slightly smaller than the distance from the pin 80 to the shell surface S. This distance between the roller and the shell S is positively maintained in operation, subject to occasional adjustment at 49, 50 when different plates are to be welded, and to wider adjustment at 43, 44 when different belts and rollers 78, 79 are employed.

The distance from the roller surface to the plate surface 79 is slight as compared with the roller diameter and belt thickness. However, it is substantially greater than the magnitude of the slight deviations from a flat shell surface which must be expected in practice, even with properly prepared work pieces. For instance the roller flange diameter may be about three inches, the belt thickness about one inch, and the distance between the roller flanges and the shell about three-sixteenths of an inch. The belt 78, guided to the roller 79 but not yet exposed to the pressure of the roller, may desirably have a substantially rectangular cross section, as best shown in Figure 8. A typical width of such cross section is about two and one-half inches, while the distance between the roller flanges may be about one inch, when shell plates from about one-quarter to about three-quarters inch thickness are welded. The belt is held symmetrically to a vertical plane through the nozzle tip 75, by small side plates 83, 84 rigidly mounted on frame 46 by bolt and nut means 85.

The flux nozzle 77 supplying the flux F to submerge the arc X extends downwardly between front parts of the carriage body plates 60, 61. It is pivoted thereto by trunnions or pins 86 and the lower end or discharge opening 76 of the flux nozzle is biased toward the shell plates S by suitable bell crank levers 87, pivoted at 88 and spring-loaded at 89. A hose 90 supplies the flux from a suitably elevated hopper or the like (not shown) to the upper end of the nozzle 77. The lower end 76 of this nozzle is spaced a very short distance above the upper surface of the flux belt 78 and the electrode nozzle tip 75; preferably a fraction of an inch from said surfaces, for reasons to be explained presently.

The belt side plates 83, 84 have identically formed top edges 91 and front edges 92, leaving substantial vertical areas 93 open and unconfined and laterally exposing the upper and front parts of the roller flanges 81, 82 and adjacent portions of the belt 78. In other words no cup effect or flux hopper is formed by any rigid side walls or gates. As a result, flux tends to run off laterally from above the belt 78 either by gravity or under the influence of wind, etc. Such flux can be recovered in well-known manner by suction means, intake nozzles of which are diagrammatically shown at 94.

In operation, the belt 78 is continually and uniformly rolled onto the shell plates P2, P3, over the roller 79. Incident to this process the flanges 81, 82 of the roller dig upwardly and forwardly into symmetrically parallel parts of the lower and back surface of the belt 78, as best shown in Figures 9 and 10. The entire body of the belt is thereby compressed and resiliently molded. Actual cuts 101, 102, extending into the back part 100 of the belt, may in some cases be formed as shown in Figure 11, if the flanges 81, 82 have narrow, cutting edges. However, it is preferred to make the edges of those flanges slightly rounded.

At the same time the undersides of the electrode nozzle 72 and tip 75 press downwardly onto the top and front surface 103 of the belt 78 above and between the roller flanges 81, 82, contributing to a molding of the belt, best shown in Figures 5, 7, 9 and 12. There results an upwardly and forwardly dished configuration of the belt's top and front surface 103, below and in front of the electrode tip 75, that is, substantially adjacent and below the arc X. The depressed center part 104 of this surface may lie, for instance, about three-sixteenths or one-fourth of an inch below the raised edges 105, 106 of the same surface, at the front of the nozzle tips. Between the center portion 104 and each side edge 105, 106 an intermediate seal portion 107, 108 is provided by the belt surface 103, in front of the roller flanges 81, 82.

The operation involves the formation of a liquid melt pool Y, supported by a congealed bead column Z, both in front of the central belt front surface 104. This belt surface usually has a forwardly concave depression 109 formed therein, which is caused by and forms a negative of the bead reenforcement 110. The cross-sectional profile of the roller 79 and its spacing from the shell plates S is such that there are formed, as roughly concentric arcuate zones about the root 111 of the bead and in backward succession therefrom:

> The melt pool Y,
> A thin fused slag layer SL,
> A thin unfused flux layer FL,
> A resiliently compressed belt layer 112, and
> The rigid roller 79.

These successive materials or structures support one another, generally in the same backward sequence as stated. The supporting or envelope function of a fused slag layer is known to the art. By itself, it is insufficient to support the hydrostatic head of a melt pool Y of any appreciable height. Even less sufficient, as a self-contained support, is a layer of unfused flux; however the thin flux layer FL serves a useful purpose not only by transmitting pressures and reactions between the slag envelope and the belt but also by thermally insulating the belt from the slag.

Due to the roundness of the roller 79 and the general flatness of the shell plates P2, P3 the belt 78 is progressively compressed, mainly in its central part 112 between the roller flanges 81, 82, thereby producing a horizontal pressure against the melt pool Y and fused slag envelope SL, which pressure increases from the top of said pool and envelope in a downward direction. This downward increase in pressure in turn tends to cause an upward flow of liquids in said pool and envelope; and by proper roller spacing and pressure control, such upward flow can be limited to the lighter constituents, that is, to the liquid slag. In Figure 12 this upward slag flow is shown by arrow D. In the vicinity of the arc X this flow is confined in front by the expanding gases of the arc zone X and in back by the flux F and belt 78. Laterally, this flow D is less confined in its upper parts, where the belt front surface 104 and then even the belt seal areas 107, 108 and belt edges 105, 106 recede from the shell plates P2, P3. Here, then, the liquid slag escapes over and around said belt edges 105, 106.

The escaping slag is mingled and further mingles with unfused flux, escaping at 93 as aforementioned and entrained by the slag. The escaping mixtures, or constituents thereof, then tend to run down by gravity in the corners between the belt edges 105, 106 and the shell plates, until the escaped slag particles congeal. Incident to this latter process, downwardly extending edge portions 113 of the belt below the arc X are likely to be destroyed, by fusion of glass fibers; this is a matter of indifference, the belt being disposable. The positive functions of the various parts of the belt are not affected by such destruction of belt portions.

These functions, according to the present invention, can now be resumed and further explained as follows:

I. The generally flat part of the belt top and front surface 103, directly below the electrode nozzle tip 71 supports a mound of flux F supplied by the nozzle 77 (Fig. 9). Upper and outer parts FO of this mound, as mentioned, escape at 93, to be substantially recovered by suction nozzles 94. A central core mound FF is substantially retained and supported by the belt surface 103. The upward dishing of the belt edges 105, 106 adjacent the arc zone X contributes to the confinement of this core mound FF, while the width of the belt 78 can be kept desirably small. Thus the arc crater X is directly submerged in flux FF which is free from gravitational flow. The front part of the core mound FF is kept temporarily stationary relative to the shell plates S and the arc zone. Consecutive bottom portions of the core mound FF are removed by melting off and ultimate lateral slag displacement, while consecutive top portions for the core mound FF are re-supplied through the upper, less stable portion F of the flux.

II. The forwardly and downwardly inclined part of surface 103, directly below the arcs X, serves as a slag escape area in general accordance with said Meyer et al. application (Fig. 12). In effect, lateral V-notch openings are formed between the shell plates S and the edges 105, 106 of the belt, in the direct vicinity of the arc X. Slag from the flow D and entrained flux F escape laterally from near the weld seam and bead, through these openings. Excessive accumulation of liquid slag, disturbing the arc X and pool Y, is avoided, partly by the basic V-shape of the escape openings and partly by the flexibility of the belt 78, which allows flexing as diagrammatically shown at 106-A. Thus the vertical relationship between the arc and the effective slag escape areas remains substantially uniform, although from time to time somewhat more slag may issue on one or the other side, depending on the unpredictable mixing of slag and flux. This vertical uniformity of the slag discharge has been found to be a feature of great importance for the production of good weld seams. At the same time the flexing and gradual forward displacement and renewal of the belt edge portions 105, 106 effectively counteracts all tendencies of the slag to choke the vent openings with freezing slag.

III. The generally vertical part of surface 103, along the shell plates P2, P3, serves as a metal melt retaining, slag melt displacing, molding, and sealing envelope (Fig. 10). The central part 104 of said surface, contacting the metal melt and slag pool Y, SL through the heat-insulating flux layer FL, applies a horizontal pressure to the exposed face of said pool which pressure increases downwardly to a maximum near the level of shaft 80. This level of maximum pressure can be placed near and below the bottom of the liquid pool, by proper design of the roller 79 and associated parts. The magnitudes of the pressure applied depend on the degree of belt compression, and this can be selected at 49, 50 so as to insure positive upward displacement of most of the liquid slag (leaving in place only a thin film, which is retained by surface cohesion with the metal and flux) and at the same time to avoid upward or other displacement of the heavier metal melt. The outer parts 107, 108 of said belt surface 103, like the inner part 104, have entrained a layer of granular flux FL when they passed through the upper parts of their travel, where they moved forwardly. Such flux layer FL is held in temporarily stationary condition, on the shell plates P2, P3. A high and well distributed forward pressure is applied to the layer FL by the belt surface; thereby safely avoiding the formation of irregular cracks in said layer FL through which any slag could partly or entirely escape on one or the other side. Thus the gravitational escape of slag and flux, on both sides of the seam, is automatically and simply held substantially uniform.

It will be noted that the carrier belt and the drive mechanism thereof, shown in said Meyer et al. application, can be omitted in view of the present rolling applications of the pressure belt, as explained above under II. In spite of this simplification, weld beads of superior quality are produced, safely and economically, with the new device. The improvement is largely due to the use of the relatively wide belt and the relatively high compression of central and mainly of symmetrically parallel portions of this belt. It is this kind of compression which provides adequate sealing, while avoiding objectionable metal melt entrainment and which at the same time, surprisingly, overcomes the disturbances due to slag vent clogging and irregular slag flow.

*The basic process according to Figures 1 to 3 or 4 to 12*

A number of features of the new process have been explained sufficiently, above. However it should be understood that modifications can be applied to the apparatus employed, the disposable belt elements, etc. The new process consists essentially in a special manner of manipulating flux and slag, along the upright work piece surface.

In both embodiments shown there is formed and maintained a flux mound having a generally vertical and stationary face which leans against the exposed work piece surface and surrounds a welding electrode tip and an arc produced thereby. Lower portions of the flux in said mound are melted by the arc. All or part of the molten flux forms the well-known slag envelope for the bead and performs the other well-known fluxing functions, such as purification of the molten metal. While such melting and associated processes take place, a generally flat, forwardly inclined, arcuately curved bottom surface of the flux mound is forwardly displaced in an uninterrupted stream. There results the formation of generally concentric, outwardly successive, forwardly compressed layers of metal melt, slag melt, and flux. Flux is resupplied at the top of the mound in order to compensate the volumetric losses which take place due to the melting down and associated processes. Simultaneously with all this the electrode and arc are gradually displaced upwardly along the work-piece surface, through the temporarily stationary flux mound.

The entire flux mound can be kept temporarily stationary, as explained in connection with Figures 1 to 3. This procedure has the advantage that no flux recovery suction system is required. However, accumulating amounts of slag are likely to vary from time to time. Considerable precaution, by sensitive instrumentation or the like, is often required to compensate for such variations, except in cases where a weld seam of changeable profile or low uniformity can be allowed.

By contrast, variations of slag accumulation are practically eliminated, without the use of any special sensitive instrumentation for the same, in accordance with Figures 4 to 12. This simplification is obtained by the use of special, somewhat unusual flux manipulating features. The relatively stationary core mound of flux is maintained under the surface layer of a larger flux mound which is allowed continuously to run off and partly to mingle with upwardly and laterally displaced slag. The unmingled, cold flux is preferably recovered by suction means or the like.

It will be understood by persons skilled in the art, upon a study of this invention, that the process as well as the apparatus can be modified in various other ways.

I claim:

1. In a welding process for use on an upright seam, the steps of rolling a slightly dished flux support member against the seam to expose an upwardly concave surface, pouring flux on to said concave surface to provide a core mound so that portions of such flux run over the side of said member, feeding a welding electrode to the seam, and upwardly traversing the member along the seam whereby successive portions of the member are rolled on to upwardly successive portions of the seam.

2. Welding apparatus for use on an upright work piece surface comprising a body of resiliently compressible, heat-resistant, heat-insulating solid material; a roller to press upwardly successive portions of the body against the work piece surface so as to partly compress the body; and welding means comprising a feedable electrode and flux depositing means to provide welding action at the work piece surface adjacent the body.

3. Apparatus as described in claim 2 wherein the roller has a pair of flanges adapted to roll in determined relation with the work piece surfaces below and laterally of the tip of the welding wire; the groove between such flanges having a cross-sectional area substantially smaller than the free cross-sectional area of the resiliently compressible body.

4. Apparatus as described in claim 2 wherein said resiliently compressible body is somewhat wider than the roller and the roller is adapted to resiliently compress longitudinally successive center portions of the body.

5. Apparatus as described in claim 4 wherein the body is an elongated strip and the roller has a pair of flanges sufficiently projecting to compress longitudinally successive portions of the strip, in front of the flanges, to a substantially greater extent than the roller otherwise compresses the strip.

6. Apparatus for the welding of substantially vertical seams comprising a carriage adapted to run along such a seam; a roller mounted on said carriage with its face opposite the seam, at a slight distance therefrom so that a compressible body can be rolled onto and compressed against the seam by the roller; and means to maintain a flux submerged arc directly above and in front of the upwardly-forwardly facing portion of such body on the roller.

7. Apparatus as described in claim 6 wherein the carriage is so constructed that upper surface portions of a body compressed by the roller, adjacent the arc, are laterally unconfined.

8. Apparatus as described in claim 6 wherein the roller is substantially vertically adjustable relative to the tip of the electrode.

9. Apparatus as described in claim 8 wherein the roller is arcuately adjustable relative to the tip of the electrode.

References Cited in the file of this patent
UNITED STATES PATENTS

| | | |
|---|---|---|
| 1,539,383 | Bienenstok | May 26, 1925 |
| 2,269,538 | Lewbers | Jan. 13, 1942 |
| 2,357,376 | Baird | Sept. 5, 1944 |
| 2,390,560 | Stanley et al. | Dec. 11, 1945 |
| 2,395,723 | Chmielewski | Feb. 26, 1946 |
| 2,432,495 | Baird | Dec. 16, 1947 |
| 2,673,916 | Meyer | Mar. 30, 1954 |
| 2,677,036 | Meyer et al. | Apr. 27, 1954 |